United States Patent Office 3,031,288
Patented Apr. 24, 1962

3,031,288
SOLID COMPOSITE PROPELLANT CONTAINING CROSSLINKED POLYESTER RESIN
Roy F. Roberts, Monrovia, Calif., assignor, by mesne assignments, to Aerojet-General Corporation, Cincinnati, Ohio, a corporation of Ohio
No Drawing. Filed Aug. 9, 1949, Ser. No. 109,409
31 Claims. (Cl. 149—19)

This invention relates to jet propulsion and provides improved solid propellant charges capable of good performance after or during exposure over a wide range of weather and temperature conditions.

This is a continuation-in-part of my co-pending application Serial No. 647,189, filed February 12, 1946, and now abandoned, entitled "Propellant Substance."

In the operation of certain types of rocket motors, it is customary to burn a solid charge in a motor chamber to produce a large valume of gas under pressure, which escapes at high velocity as a gas jet through an exhaust nozzle leading from the chamber and producing a resultant high thrust. Typical solid charges have heretofore commonly comprised a thermoplastic fuel such as asphalt having mixed with it a finely divided oxidizing substance in sufficient quantity to burn the fuel. This mixture is ordinarily formed into a solid mass within the chamber, presenting a surface at which the burning occurs.

Rocket motors are commonly exposed to a wide variety of weather conditions and a wide range of temperatures between the time of their manufacture and the time of use. Solid propellant charges of the type above-described often tend to sag under tropical conditions or become brittle and develop cracks at very low temperatures, thus producing larger or irregular burning surfaces. The formation of enlarged exposed surfaces or cracks is undesirable as it increases the area of burning, thus, accelerating combustion with an attendant pressure rise in the motor chamber, which may produce an explosion.

According to my invention, I provide effective solid propellant charges which do not become unduly brittle or crack at low temperatures and are resistant to sagging in tropical environment.

My novel propellant charge comprises an intimate mixture of a finely-divided oxidizer, uniformly distributed in a resinous binder which acts as a fuel. The resin preferably comprises a polyester component, that is, the reaction product of a polycarboxylic acid with a polyhydric alcohol with which there is incorporated a monomeric olefin component such as a vinyl, allyl or other olefin, compatible with the liquid resin.

The polyester component, sometimes known as an alkyd component or alkyd resin should possess some degree of unsaturation in the molecule in order to permit it to heteropolymerize with the olefinic component, which also possess unsaturation, and which may be for example, phenyl substituted lower alkenes, such as styrene lower alkenyl esters of lower alkanoic acids, such as vinyl acetate, lower alkyl esters of lower alkenoic acids, such as esters of acrylic or methacrylic acid; allyl compounds, such as allyl diglycol carbonate, lower alkenyl esters of lower alkanoic acids, such as diallyl malleate, diallyl diglycollate; other olefinic components, including lower alkyl dienes such as butadiene, lower alkynes, such as acetylene, etc.; and derivatives of any of the above substances which will polymerize with the resin. In general, any olefin compatible with the resin and which will polymerize with it, is suitable. This includes essentially all unsubstituted olefins; and in addition, many substituted olefins. The reason for having unsaturation present in the polyester is to permit the resulting unsaturated polyester to copolymerize with the double bond in the vinyl, allyl or other olefinic additives. When a sufficient amount of cross-linkage occurs, the resin becomes thermosetting. With a lesser degree of cross linkage, the resin may be thermoplastic; and in some cases the resin may possess some of the properties of both thermoplastic and thermosetting resins. All these types of resins are within the purview of the present invention.

The polyester component can be made in general as follows: The hydroxy groups of dihydric or polyhydric alcohols are permitted to react, in the presence of the monomeric vinyl, allyl or other olefinic component, with the polycarboxylic groups of, for example, a dicarboxylic acid, or a mixture of dicarboxylic acids, thereby producing a saturated polyester. The unsaturation to permit the polyester to heteropolymerize with the monomeric vinyl, allyl or other olefinic component may be supplied by employing either unsaturated polyhydric alcohol or unsaturated dicarboxylic acid. The usual and preferred manner is to employ mixtures of unsaturated polycarboxylic acid or anhydride with a saturated or aromatic polycarboxylic acid, or anhydride, and treating this mixture with a polyhydric alcohol. The percentage of the unsaturated acid or anhydride should be sufficient to permit the necessary amount of copolymerization between the vinyl, allyl or other olefinic additive and the polyester. The polyester may be present in amounts varying between 10% and 70% by weight based on the weight of the polyester-olefinic additive mixture. However, in general 50% by weight of polyester to 50% by weight of the olefinic additive produces a satisfactory polyester resin type of matrix for the propellant.

The alcohols that can be used are not limited, however, to the dihydric alcohols, as other polyhydric alcohols, such as the trihydric and higher polyhydric alcohols may be used. These afford additional possibilities for cross-linking and as a consequence the toughness and brittleness of the final resin may be controlled as desired.

For the polyhydric alcohol component any of the following alcohols may be used: dihydric alcohols, such as ethylene glycol, diethylene glycol, triethylene glycol, propylene glycol; a trihydric alcohol such as glycerol; tetrahydric alcohols such as the erythritols and pentaerythritol; pentitols which include arabitol, adonitol, xylitol; hexitols including mannitol, sorbitol, dulcitol; and heptitols such as persitol and volamitol, etc. Mixtures of any of the above alcohols may also be employed if desired.

Saturated polycarboxylic acids useful in compounding the polyester resins are, for example, the aliphatic, dibasic acids, including: oxalic, malonic, succinic, glutaric, adipic, pimelic, sebacic, azelaic acids, etc., and the saturated anhydrides such as succinic anhydride. Examples of the unsaturated carboxylic acids useful as the acidic components in forming polyester resins are: maleic acid, fumaric acid, citraconic acid, mesaconic acid, itaconic acid, etc. The anhydrides, such as maleic anhydride, citraconic anhydride, itaconic anhydride and phthallic anhydride, may likewise be used for supplying the desired unsaturation.

Regardless of which of the saturated acids are used, the degree of unsaturation necessary to provide cross-linkage with the vinyl, allyl, or other olefinic components, may be had by the addition of any of the above-named unsaturated acids or their anhydrides.

In some cases it may be possible to dispense with the use of the foregoing unsaturated polycarboxylic substances; and instead, to form a polyester resin by modifying the polyester by incorporating into it, a modifying oil which has some degree of unsaturation and is compatible with the polyester. From a trace to 1 mole of the modifying oil may be added to 1 mole of the polyester. The examples of such oils are: castor oil, mustard seed oil, rape oil, haddock liver oil, linseed oil, hemp oil, poppy seed oil, Chinese and Japanese wood oil, tung oil, olive oil, etc. The unmodified or modified resin may then be blended with the allyl, vinyl or other olefinic monomers described above to produce mixtures which are capable of being polymerized into the cross-linked type of thermosetting resin, or the modified resin may be employed without further additives.

My novel solid propellant comprises a uniform dispersion of a finely-divided inorganic oxidizer in a polyester resin matrix of the type described above. The resin acts as a binder and, regardless of substituents in the molecule, will serve as a fuel if the propellant contains a sufficient amount of oxidizer to insure the necessary oxidation of the organic material; usually all of the carbon is oxidized to CO and one-third of the hydrogen is oxidized to water. As stated above, the preferred condensation product is obtained by reacting the polyhydric alcohol with a polycarboxylic acid having a predetermined degree of unsaturation in the molecule. An especially useful form of this condensation product is the reaction product of sebacic acid and a polyhydric alcohol such as propylene glycol, to which there has been added a small amount of unsaturated anhydride, such as maleic anhydride. This product is commonly called a modified alkyd resin.

The percentage of unsaturation in the polyhydric alcoholpolycarboxylic acid mixture to form the polyester should be between about 2 and 100% by weight based on the weight of the total polycarboxylic acid or polycarboxylic acid mixture. The preferred percentage of unsaturation is between about 10% and 20% by weight based on the weight of the acidic component. Although the polyhydric alcohol and polycarboxylic acid will react in stoichiometric proportions, nevertheless, it is usually a better practice to use an excess of the polyhydric alcohol beyond the stoichiometric amount; and then remove the excess alcohol from the finished polyester, in order to make the resulting product substantially free from unnecessary matter or impurities.

One particular form of heteropolymerizable mixture, which I prefer to use in carrying out my invention comprises 4 moles of sebacic acid, 1 mole of maleic anhydride and 5 moles of propylene glycol. Such an alkyd resin is available commercially and is hereafter referred to as "resin A." A related product, also available commercially and hereafter referred to as "resin B," already contains the olefinic component, namely styrene. It is a heteropolymerizable resin, compounded by mixing approximately 50% by weight of styrene with 50% by weight of resin A.

Another example of such a resin, which has been found to be particularly useful, is the condensation product of adipic acid and diethylene glycol, to which there has been added a small amount of maleic anhydride. Such a resin, hereafter referred to as resin D, is made by mixing 7 moles of adipic acid, 3 moles of maleic anhydride and 11 moles of diethylene glycol. A related resin, hereafter referred to as resin C is made by mixing 7 moles of adipic acid, 3 moles of maleic anhydride and 12 moles of diethylene glycol. Other resins, compounded by using polyhydric alcohols including any of the higher polyhydric alcohols listed above, polycarboxylic acids and anhydrides, may also be used.

The specific resins identified above as resin A, resin C and resin D can be made to polymerize with the vinyl, allyl or other olefinic type of monomers to form the desired heteropolymerized resin. The amount of olefinic monomer, such, for example, as styrene, may range from about 25% to about 100% by weight based on the weight of the monomer-resin mixture, and the amount of the monomer to be used in each case is determined by the particular properties which are desired in the finished resin. The olefinic monomers listed above are all liquids and thereby serve as solvents for the heavier alkyd resin, thus facilitating the ease with which the oxidizer may be dispersed throughout the liquid resin before curing.

For the oxidizer, I prefer to use any stable, solid, inorganic. The oxidizer is a substance which may be incorporated in the polyester resin unsaturated polycarboxylicolefinic monomer mixture by stirring and mixing, and I preferably add the oxidizer to the mixture while the resin is in its liquid state. Examples of suitable oxidizers are the inorganic substances including the chromates, dichromates, permanganates, nitrates, chlorates and perchlorates, such as the alkali metal salts of these radicals, including sodium, potassium, lithium, rubidium and caesium; and also the non-metallic salts of the same radicals such as ammonium and hydrazine. The selection of the oxidizing material depends upon the type of propellant and the specific burning properties desired. The preferred oxidizers are the perchlorates, especially the perchlorates of potassium and ammonium. The amount of oxidizer added to the resinous mixture usually lies between 45% and 90% by weight of the total propellant composition and the weight of the polyester resin-unsaturated polycarboxylic-olefinic monomer mixture should lie between 55% and 10% of the same propellant composition.

Catalytic substances are particularly useful for speeding up the rate of polymerization of the said polyester resin-monomer mixtures with the oxidizer added. Such catalytic substances are the organic peroxides and the organic peresters. The temperature used for curing is dependent somewhat upon the nature of the catalyst and the time during which it is desired to accomplish complete polymerization.

Some catalysts such as 1 hydroxy cyclo hexyl hydro peroxide, cumene hydroperoxide are capable of polymerizing certain resins such as Resin B, at room temperature if the charge is permitted to cure for a sufficiently long period of time.

The organic peroxides or peresters should be preferably soluble or compatible with the polyester resin. However, in some instances even an insoluble organic peroxide or perester functions as a catalyst as long as it can be made to decompose and liberate a free oxygen radical. Specific examples of compounds which are suitable catalysts for this polymerization reaction are: tertiary butyl hydro peroxide, cumene hydro peroxide, benzoyl peroxide, lauryl peroxide, acetobenzoyl peroxide, ditertiary butyl peroxide, methyl ethyl ketone peroxide, 1-hydroxy cyclohexyl hydro peroxide, cyclo alkane hydrocarbon peroxide and other hydro peroxides which are not too volatile at the curing temperature.

Specific examples of suitable peresters are: Tertiary butyl perbenzoate, and ditertiary butyl diperphthalate.

Such catalysts should be present in the polyester resin-carboxylic-olefinic mixture during the time it is subjected to the curing process. In general the weight of the catalyst employed to bring about this result is approximately 0.5% by weight based on the weight of the combined polyester resin-carboxylic-olefinic mixture. If desired, larger amounts of the catalysts may be employed than those indicated.

In order to provide steady burning at low pressure with some oxidizers, it is beneficial to incorporate into the propellant mass approximately 1% by weight of carbon black which is added to the liquid mixture at the time the oxidizer is incorporated therein and before the mixture is cured.

The manner in which I prefer to compound the propellant is as follows: The amount of oxidizer required to cause the fuel to oxidize to the proper degree is uniformly stirred into the liquid polyester resin-olefinic monomer mixture. Stirring is continued at room temperature until all of the oxidizer has been added and the mixture has a uniform consistency. A catalyst capable of accelerating polymerization of the resin mixture is added thereto and intimately incorporated therein before or at the time the oxidizer is added. The stirred mixture, with the catalyst incorporated therein, is cast into a suitable mold, ordinarily cylindrical in outline, and the material is allowed to cure. The cast mass is generally cured at temperatures ranging from ambient to 220° F. If the lower temperatures are used, the charge requires a considerable period of time to cure. If a shorter time is desired the more elevated temperatures can be used.

Examples of propellant compositions using the various forms of thermosetting alkyd resin with additives and various oxidizers are shown below:

Example 1

| | Percent by weight |
|---|---|
| Resin B | 26.85 |
| KClO$_4$ | 73.00 |
| Tertiary butyl hydro peroxide | 0.15 |
| Total | 100.00 |

Example 2

| | |
|---|---|
| Resin B | 27.96 |
| KClO$_4$ | 71.90 |
| Tertiary butyl hydro peroxide | 0.14 |
| Total | 100.00 |

Example 3

| | |
|---|---|
| Resin B | 23.85 |
| KClO$_4$ | 70.00 |
| NH$_4$ClO$_4$ | 6.00 |
| Tertiary butyl hydro peroxide | 0.15 |
| Total | 100.00 |

Example 4

| | |
|---|---|
| Resin B | 26.95 |
| NH$_4$ClO$_4$ | 36.50 |
| KClO$_4$ | 36.50 |
| Tertiary butyl hydro peroxide | 0.05 |
| Total | 100.00 |

Example 5

| | |
|---|---|
| Resin B | 26.07 |
| KClO$_4$ | 70.87 |
| KNO$_3$ | 2.91 |
| Tertiary butyl hydro peroxide | 0.15 |
| Total | 100.00 |

Example 6

| | |
|---|---|
| Resin A | 14.91 |
| Styrene | 9.94 |
| KClO$_4$ | 74.00 |
| Tertiary butyl hydro peroxide | 0.15 |
| Thermal black carbon | 1.00 |
| Total | 100.00 |

Example 7

| | |
|---|---|
| Resin A | 10.73 |
| Styrene | 13.12 |
| NH$_4$ClO$_4$ | 76.00 |
| Tertiary butyl hydro peroxide | 0.15 |
| Total | 100.00 |

Example 8

| | |
|---|---|
| Resin B | 24.85 |
| KClO$_4$ | 74.00 |
| Tertiary butyl hydro peroxide | 0.15 |
| Thermal black carbon | 1.00 |
| Total | 100.00 |

Example 9

| | Percent by weight |
|---|---|
| Resin B | 20.85 |
| KClO$_4$ | 78.00 |
| Tertiary butyl hydro peroxide | 0.15 |
| Thermal black carbon | 1.00 |
| Total | 100.00 |

Example 10

| | |
|---|---|
| Fuel | 24.75 |
|   Resin C | 50% |
|   Styrene | 50% |
| 1-hydroxy cyclohexyl hydro peroxide-1 | 0.25 |
| NH$_4$ClO$_4$ | 75.00 |
| Total | 100.00 |

Example 11

| | |
|---|---|
| Fuel | 26.75 |
|   Resin D | 50% |
|   Methyl methacrylate | 20% |
|   Styrene | 30% |
| NH$_4$ClO$_4$ | 73.00 |
| 1-hydroxy cyclohexyl hydro peroxide-1 | 0.25 |
| Total | 100.00 |

Example 12

| | |
|---|---|
| Resin D | 12.37 |
| Styrene | 6.19 |
| Methyl methacrylate | 6.19 |
| NH$_4$ClO$_4$ | 75.00 |
| Cumene hydro peroxide | 0.25 |
| Total | 100.00 |

It will be understood that the presence of impurities or contaminants or other extraneous material than those mentioned hereinabove, and which do not materially alter the burning properties of the propellant, does not depart from the scope of this invention.

An advantage of employing the invention described above is that it is possible to compound propellants of the so-called solid type that are substantially homogeneous in composition and are relatively free from cavities and air bubbles. The propellants are cured to a hard, tough, dense mass which is relatively insensitive to temperature changes and shocks. These propellant charges may be subjected to the sub-zero temperatures of the arctic or to the elevated temperatures of the tropics without undergoing any harmful changes.

A further advantage of my present invention resides in the fact that the propellant ingredient may be composited at room temperature, relieving the necessity of heating any of the ingredients at the time that the oxidizer is incorporated into the resin, thus saving time within which the operations can be conducted. These mixtures are cured at temperatures which do not materially exceed 200° F.; therefore, no additional hazard is introduced during the curing operations.

I claim:

1. A solid propellant composition comprising a cured, intimate mixture of solid inorganic oxidizing salt, and a cross-linked polymerized polyester resin-styrene mixture, the polyester resin being the condensation product of propylene glycol, maleic anhydride and sebacic acid, said inorganic oxidizing salt being present in an amount between 45% and 90% by weight of the total propellant composition.

2. A solid propellant composition comprising a cured mixture of potassium perchlorate intimately dispersed in a heteropolymerized resin consisting of styrene cross-linked with the condensation product of propylene glycol, maleic anhydride and sebacic acid, said styrene-condensation product mixture being present in an amount between 55% and 10% by weight of the propellant composition and said potassium perchlorate being present in an amount between 45% and 90% by weight based on the weight of the propellant composition.

3. A solid propellant composition comprising a cured mixture of ammonium perchlorate, intimately dispersed in a heteropolymerized polyester resin consisting of a mixture of styrene and the condensation product of propylene glycol, maleic anhydride and sebacic acid, said styrene-polyester resin mixture being cross-linked and being present in an amount between 55% and 10% by weight of the propellant composition and said ammonium perchlorate being present in an amount between 45% and 90% by weight based on the weight of the propellant composition.

4. A solid propellant composition comprising a cured mixture of inorganic perchlorate intimately dispersed in a thermosetting polyester resin consisting of a mixture of styrene and the condensation product of diethylene glycol, maleic anhydride and adipic acid, said styrene-polyester resin mixture being cross-linked and being present in an amount between 55% and 10% by weight of the propellant mixture and said inorganic perchlorate being present in an amount between 45% and 90% by weight based on the weight of the propellant composition.

5. A solid propellant composition comprising a cured mixture of potassium perchlorate, a heteropolymerized polyester resin consisting of a mixture of styrene cross-linked with a condensation product of propylene glycol, maleic anhydride and sebacic acid, said styrene-condensation product mixture being present in an amount between 55% and 10% by weight based on the weight of the propellant composition, said potassium perchlorate being intimately dispersed in the mixture and being present in an amount between 45% and 90% by weight based on the weight of the propellant composition, and about 1% of carbon black based on the weight of the propellant composition, intimately dispersed throughout the composition.

6. A solid propellant composition comprising a cured intimate mixture of a solid inorganic oxidizing salt, said inorganic oxidizing salt being present in an amount of from about 45% to 90% by weight of the total propellant composition and an unsaturated polyester resin consisting of the condensation product of a saturated polyhydric alcohol and polycarboxylic acid heteropolymerized with an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate, and mixtures thereof.

7. The composition of claim 6 to which a blending agent selected from the group consisting of animal and vegetable oils has been added.

8. The composition of claim 6 to which carbon black has been added.

9. The composition of claim 6 to which a polymerization catalyst selected from the group consisting of organic peroxides and peresters capable of decomposing to form free oxygen radicals to catalyze the curing of the resin, has been added.

10. The composition of claim 9 wherein the polymerization catalyst added is tertiary butyl perbenzoate.

11. The composition of claim 9 wherein the polymerization catalyst added is tertiary butyl hydroperoxide.

12. A solid propellant composition comprising a cured intimate mixture of a solid inorganic oxidizing salt, said inorganic oxidizing salt being present in an amount of from about 45% to 90% by weight of the total propellant composition and an unsaturated polyester resin consisting of the condensation product of diethylene glycol and polycarboxylic acid heteropolymerized with an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate and mixtures thereof.

13. A solid propellant composition comprising a cured intimate mixture of a solid inorganic oxidizing salt, said inorganic oxidizing salt being present in an amount of from about 45% to 90% by weight of the total propellant composition and an unsaturated polyester resin comprising the condensation product of propylene glycol and polycarboxylic acid heteropolymerized with an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate and mixtures thereof.

14. A solid propellant composition comprising a cured intimate mixture of a solid inorganic oxidizing salt, said inorganic oxidizing salt being present in an amount of from about 45% to 90% by weight of the total propellant composition and an unsaturated polyester resin comprising the condensation product of a polyhydric alcohol, a dibasic alkenoic acid anhydride and a dibasic alkanoic acid heteropolymerized with a phenyl substituted lower alkene.

15. The composition of claim 14 wherein a mixture of inorganic oxidizing salts is employed.

16. The composition of claim 14 wherein the inorganic oxidizing salt is a perchlorate salt.

17. A solid propellant composition comprising a cured intimate mixture of a solid inorganic oxidizing salt, said inorganic oxidizing salt being present in an amount of from about 45% to 90% by weight of the total propellant composition and an unsaturated polyester resin comprising the condensation product of diethylene glycol, lower alkenoic acid anhydride, and a lower dibasic alkanoic acid heteropolymerized with a phenyl substituted lower alkene.

18. The composition of claim 17 wherein the inorganic oxidizing salt is a mixture of inorganic oxidizing salts.

19. The composition of claim 17 wherein the inorganic oxidizing salt is a perchlorate salt.

20. A solid propellant composition comprising a cured intimate mixture of a solid inorganic oxidizing salt, said inorganic oxidizing salt being present in an amount of from about 45% to 90% by weight of the total propellant composition and an unsaturated polyester resin comprising the condensation product of diethylene glycol, maleic anhydride, and adipic acid heteropolymerized with styrene.

21. A solid propellant composition comprising a cured intimate mixture of a solid inorganic oxidizing salt, said inorganic oxidizing salt being present in an amount of from about 45% to 90% by weight of the total propellant composition and an unsaturated polyester resin comprising the condensation product of propylene glycol, a lower alkenoic acid anhydride, and a dibasic lower alkanoic acid heteropolymerized with a phenyl alkene.

22. The composition of claim 21 wherein the solid inorganic oxidizing salt is a mixture of inorganic oxidizing salts.

23. The composition of claim 21 wherein the solid inorganic oxidizing salt is a perchlorate salt.

24. A solid propellant composition comprising a cured intimate mixture of a solid inorganic oxidizing salt, said inorganic oxidizing salt being present in an amount of from about 45% to 90% by weight of the total propellant composition and an unsaturated polyester resin comprising the condensation product of a polyhydric alcohol, a lower alkenoic acid anhydride, and a dibasic lower alkanoic acid heteropolymerized with a mixture of a phenyl alkene and a lower alkenoic acid ester.

25. The composition of claim 24 wherein the solid inorganic oxidizing salt is a mixture of inorganic oxidizing salts.

26. The composition of claim 24 wherein the solid inorganic oxidizing salt is a perchlorate salt.

27. A solid propellant composition comprising a cured intimate mixture of a solid inorganic oxidizing salt, said inorganic oxidizing salt being present in an amount of from about 45% to 90% by weight of the total propellant composition and an unsaturated polyester resin consisting of the condensation product of diethylene glycol, a dibasic lower alkenoic acid anhydride, a dibasic lower alkanoic acid heteropolymerized with a mixture of a phenyl alkene and a lower alkenoic acid ester.

28. A solid propellant composition comprising a cured intimate mixture of ammonium perchlorate in an amount of from about 45% to 90% by weight of the total propellant composition and an unsaturated polyester resin comprising the condensation product of diethylene glycol, maleic anhydride, and adipic acid heteropolymerized with a mixture of styrene and methylmethacrylate.

29. A solid propellant composition comprising a cured intimate mixture of potassium perchlorate in an amount of from about 45% to 90% by weight of the total propellant composition and an unsaturated polyester resin consisting of the condensation product of diethylene glycol, maleic anhydride, and adipic acid heteropolymerized with a mixture of styrene and methylmethacrylate.

30. A solid propellant composition comprising a cured intimate mixture of ammonium and potassium perchlorate in an amount of from about 45% to 90% by weight of the total propellant composition and an unsaturated polyester resin consisting of the condensation product of diethylene glycol, maleic anhydride, and adipic acid heteropolymerized with a mixture of styrene and methylmethacrylate.

31. A solid propellant composition comprising a cured intimate mixture of a solid inorganic oxidizing salt, said inorganic oxidizing salt being present in amount of about 70% by weight of the total propellant composition, and an unsaturated polyester resin comprising the condensation product of a polyhydric alcohol, a dibasic alkenoic acid anhydride and a dibasic alkanoic acid copolymerized with a phenyl substituted lower alkene, the said condensation product and the said phenyl substituted lower alkene being present in about equal parts by weight.

References Cited in the file of this patent

UNITED STATES PATENTS

| | | |
|---|---|---|
| 2,155,499 | Lawson | Apr. 25, 1939 |
| 2,193,124 | Doran | Mar. 12, 1940 |
| 2,361,019 | Gerhart | Oct. 24, 1944 |
| 2,388,319 | Fuller | Nov. 6, 1945 |
| 2,479,828 | Geckler | Aug. 23, 1949 |
| 2,537,520 | Eger | Jan. 9, 1951 |
| 2,539,404 | Crutchfield et al. | Jan. 30, 1951 |
| 2,562,140 | Dafter | July 24, 1951 |
| 2,563,784 | Hammond | Aug. 7, 1951 |

FOREIGN PATENTS

| | | |
|---|---|---|
| 579,057 | Great Britain | July 22, 1946 |

OTHER REFERENCES

Deming: General Chemistry, 3rd edition, John Wiley and Sons (1930), pages 250–252. (Copy in Division 70.)